INVENTOR.
STEPHEN A. BOHRER
WILLIAM E. DeLISLE
BY
Stanley M. Schurger
ATTORNEY

BIT SYNCHRONIZER

Filed Aug 17, 1966

INVENTOR.
STEPHEN A. BOHRER
WILLIAM E. DeLISLE

BY Stanley M. Schurgin

ATTORNEY

United States Patent Office 3,488,526

Patented Jan. 6, 1970

3,488,526

BIT SYNCHRONIZER

Stephen A. Bohrer, Clarence, and William E. De Lisle, Cheektowaga, N.Y., assignors to Sylvania Electric Products Inc., a corporation of Delaware Filed Aug. 17, 1966, Ser. No. 573,059
Int. Cl. H03k 1/12
U.S. Cl. 307—262 5 Claims

ABSTRACT OF THE DISCLOSURE

A bit synchronizer comprising a pulse shaping circuit for deriving transition pulses from an incoming digital information stream, a digital phase lock loop for providing a local timing signal, and a logic network for providing a reshaped and retimed digital stream in response to timing signal sampling of the incoming digital stream. The phase lock loop includes a digital phase detector to which the derived transition pulses are applied, a push-pull drive and decoupling circuit, an integrator type loop filter, and a voltage controlled free-running blocking oscillator.

This invention relates to means for bit synchronizing a local timing signal with received binary coded information to enable accurate reading of the coded data carried by the information signal. The invention further relates to means for reshaping and retiming a stream of digital information.

In digital communication systems, information is represented as a binary coded sequence of equal time interval bits, each having a "1" or "0" state. Typically this information is transmitted by on-off keying, frequency shift keying (FSK), amplitude shift keying (ASK), or phase shift keying (PSK), or one of the other modulation techniques available. Demodulation at the receiver ideally results in the generation of a digital information stream wherein a binary "1," or "mark," is represented by generation of a first voltage level for the given bit period, and a binary "0," or "space," is represented by generation of a second voltage level for the bit period. Generation of $n$ successive "marks" results in a constant first voltage level for $n$ successive bit periods, and $n$ successive "space" signals appears as a constant second voltage level for a period of $n$ bits. The resulting ideal digital waveform, therefore, is a series of rectangular pulses with sharp transitions from the "mark" to "space" and "space" to "mark" levels.

A common method of reading such a binary coded data stream is to employ a short sampling pulse for each data bit; since the data bits are of uniform time duration, this is accomplished by setting the sample pulse rate equal to the bit rate. Each sampling pulse serves to open or close associated logical gating circuitry depending upon the state of the bit being sampled. However, when such signal information is transmitted any appreciable distance, the binary signals are susceptible to many possible types of distortion. The effect of distortion may be to randomly vary the pulse width or shape, or both, or the effect may be to introduce a constant distortional effect, e.g., the pulse widths of one state may be caused to be of different length than the pulse widths of the other state.

The cumulative effect of the various types of distortion is to vary the widths of the different pulses, and, if the distortion is great enough, during a given interval, the sampling pulse may even be reading the wrong bit of information. To insure accuracy, therefore, it is desirable that the sampling occur at the middle of each of the detected data pulses or bits so that substantial distortion would be required before incorrect reading would result. Viewing the problem for the case of narrow band, passive filter detectors, it is clear that the signal-to-noise ($S/N$) characteristics of the distorted waveform would most probably be very poor in the transition region and optimum at the middle of a pulse; consequently, middle-of-the-bit sampling insures that mark-space decisions are made at the maximum $S/N$ ratio.

One method of insuring that the sampling pulse will occur at the proper time is to generate locally at the receiver a square wave timing signal having a frequency equal to the bit rate, and to generate a sampling pulse in response to each positive-going (or each negative-going) transition of the timing signal. This transition can be made to occur, theoretically, at the middle of each detected data bit if the timing signal is accurately phase synchronized to the data signal bit rate. However, if for some reason, e.g., due to drift of the transmitter clock, the signals are out of synchronization during any given interval, then the sampling pulse for that interval would not be generated at the proper point in time. It is required, therefore, that the locally generated timing signal be bit synchronized with the incoming data signals, and that such synchronization be maintained. Further, it is usually required that the stream of distorted digital information be reshaped and retimed for further processing in a decoder.

The requisite bit synchronization is usually accomplished by use of a phase lock loop closed through some type of voltage controlled oscillator (VCO), and the reshaping and retiming is provided by associated logic circuitry. Prior art bit synchronizer circuits, however, have been quite complex due to the digital waveforms required to be generated and the need for a memory capability to maintain VCO frequency offset during extended periods of disappearance of the phase error signal; such loss of the loop error signal would occur for periods between input data signal transitions which exceed the time constant of the phase loop, as would result from reception of a long series of "ones" or "zeros." Also, previous synthesizers have employed a stepping capacitor, varicaps, or variable inductor as the VCO control element, each of which have disadvantages. Stepping capacitors are a low reliability component and have a relatively high control current requirement. Varicaps do not provide a sufficient control range at frequencies below 50 kc./sec. Variable inductors are relatively large and have a high control current requirement; also, they are comparatively expensive and usually a special part.

Accordingly, a principal object of the present invention is to provide a bit synchronizer which is comparatively simple in its construction and may be implemented with inexpensive, standard components.

Another object of the invention is to provide improved means for reshaping and retiming a stream of digital information and for assuring a more accurate decoding of binary information.

A further object is to provide an improved phase lock loop capable of maintaining a voltage controlled oscillator in synchronism with an input data source which provides pulses having a variable periodicity.

Briefly, these and related objects are achieved by a bit synchronizer which includes a pulse shaping circuit for deriving transition pulses from the incoming digital information stream, a unique digital phase lock loop for providing a local timing signal which is phase locked to the input information bit rate, and a simple output logic network for providing a reshaped and retimed digital stream in response to timing signal sampling of the incoming digital stream. The phase lock loop comprises a digital phase detector to which the derived transition pulses are applied, a push-pull drive and decoupling circuit, an integrator type loop filter, and a voltage controlled free-running blocking oscillator. In the absence of a control signal, the blocking oscillator operates at a nominal pulse repetition frequency of twice the bit rate of the incoming digital information stream. The pulse train output of this blocking oscillator is used to drive a divide-by-two circuit, which then provides a pair of 180° phase displaced square wave signals having the same nominal frequency as the incoming bit rate. Both of these square wave signals are used as a time frame reference for the digital phase detector, which comprises a pair of early-late gates, and one of the square wave signals is also used as the local timing signal. If an input transition pulse occurs during the first half of a square wave cycle, this indicates the timing signal is leading the received data bit rate, and the appropriate gate generates a "retard" pulse. A transition pulse during the second half of the square wave cycle indicates the timing signal is late, and the other gate generates an "advance" pulse. The push-pull drive circuit comprises a pair of monostables connected to be respectively triggered by the "advance" and "retard" pulses and a summing circuit connected across the outputs of the monostables to provide a common bipolar drive to the filter. The decoupling circuit comprises a diode isolation network which effectively holds the control voltage level in the loop filter so as to maintain frequency offset during extended periods of disappearance of the bipolar drive pulses, such as would occur for a long series of "marks" or "spaces" in the received signal.

A free-running blocking oscillator circuit is employed wherein the pulse repetition frequency is controlled by an IC (current×capacitance) timing circuit. In particular, a transistorized blocking oscillator is described in which the collector of the blocking oscillator transistor is transformer coupled to one terminal of a timing capacitor, the other terminal of which is connected to the base electrode of the oscillator transistor. When the blocking oscillator transistor conducts, a pulse is generated which charges the timing capacitor to a positive level, and the transistor will not conduct again until its capacitor controlled base voltage has been discharged to a sufficiently low level. To control discharge time, a variable current source is employed which comprises a second transistor having its emitter connected through a resistor to the timing capacitor and its collector connected to a source of negative potential, the current flow through said second transistor being base controlled by the DC steering signal from the loop filter.

The divider output square wave selected for use as the timing signal is also passed through a differentiator to obtain sampling pulses, the sampling pulses of a given polarity representing the middle-of-the-bit transitions of said timing signal square wave, with respect to the bit period of the incoming detected digital stream. The logic circuit for providing a reshaped and retimed digital stream comprises a flip-flop having a pair of input AND gates. The sampling pulses and the incoming digital stream are applied to one AND gate, and the sampling pulses and an inverted version of the incoming digital stream are fed to the other AND gate. The flip-flop provides a pair of mutually inverted outputs which are reshaped and retimed versions of the incoming digital information stream.

Other objects, features and advantages of the invention, and a better understanding of its construction and operation, will be evident from the following description taken in connection with the accompanying drawings, in which.

Figures 1, 2:
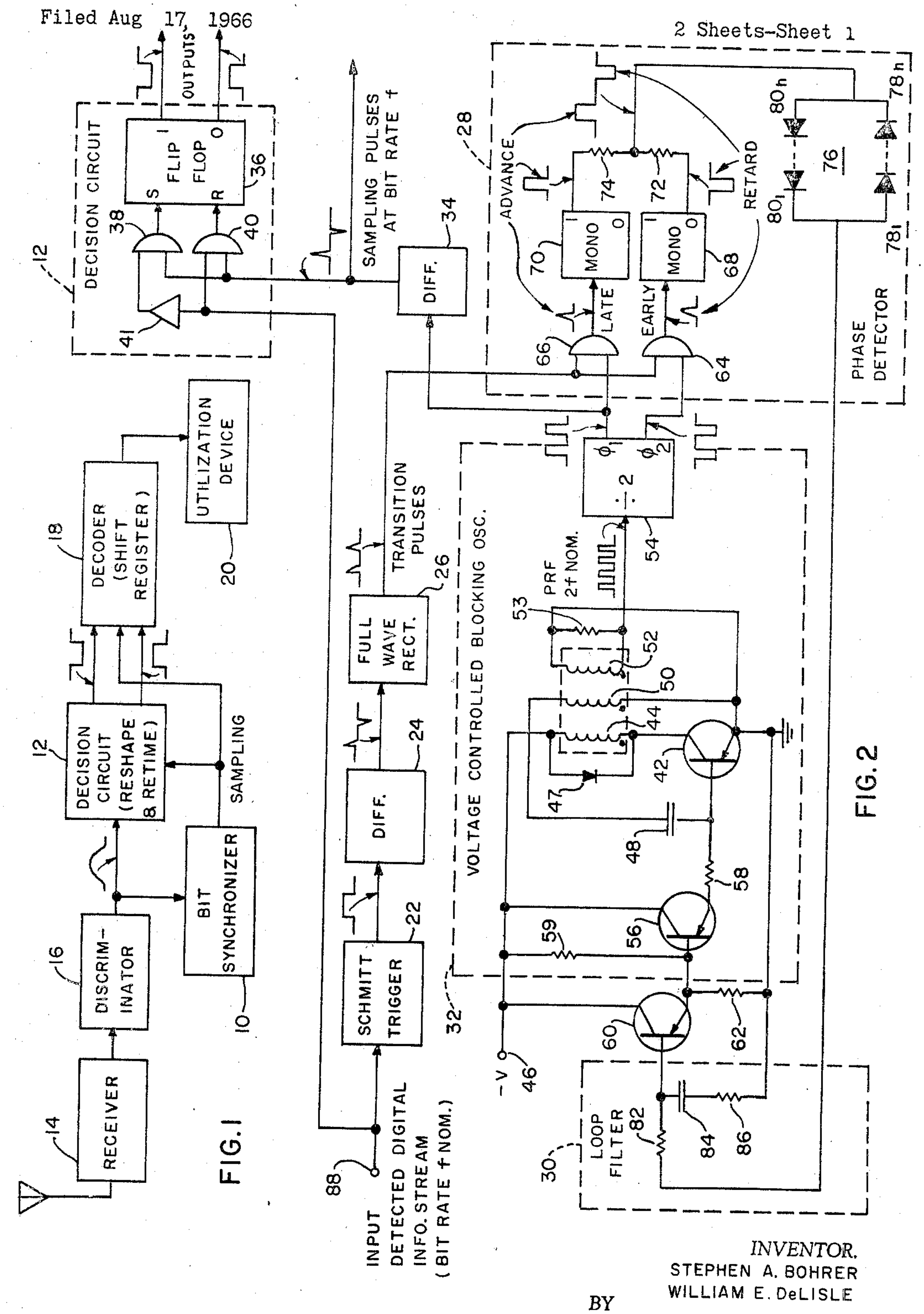
FIG. 1 is a block diagram of a receiving station including a bit synchronizer and a reshaping and retiming means in accordance with the present invention.
FIG. 2 is a combined circuit schematic and block diagram of a preferred embodiment of the invention.

FIG. 1 illustrates a typical application of the present invention in which a bit synchronizer 10 and decision circuit 12, in accordance with the invention, are incorporated in an otherwise conventional digital communications receiving station comprising a receiver 14, discriminator 16, decoder 18 and utilization device 20. Receiver 14 includes the usual circuitry for mixing the received radio frequency (RF) signal with a local oscillator signal and providing an amplified intermediate frequency (IF) output signal. Discriminator 16 comprises well-kown circuit means for demodulating the receiver IF output signal and providing as an output the detected digital information stream. As discussed above, however, the digital waveform of this detected output will very likely be band limited and otherwise distorted due to RF transmission path effects. Consequently, the digital stream from discriminator 16 is processed through decision circuit 12 for reshaping and retiming prior to decoding and also is fed to bit synchronizer 10, which is thereby responsive to generate the desired middle-of-the-bit sampling pulses for the decoder. Decoder 18 normally comprises a shift register which is loaded by a pair of mutually inverted rectangular wave outputs from the decision circuit 12 and timed by the sampling pulse output of bit synchronizer 10. The output of the decoder is applied to utilization device 20, which, for example, may comprise data processing equipment such as a computer or teletypewriter printer.

The structure and operation of bit synchronizer 10 and decision circuit 12 will now be explained in detail; the other components of the receiving station are well known to those skilled in the art of radio communication and electronic data processing; consequently, there is no need here for a detailed explanation of them or of the overall operation of the station.

Referring now to FIG. 2, bit synchronizer 10 comprises: pulse shaping circuitry consisting of a Schmitt trigger circuit 22, differentiator 24 and full wave rectifier 26 for deriving transition pulses from the incoming detected digital stream; a phase detector 28 to which the derived transition pulses are applied as an input signal; a loop filter 30 for integrating and smoothing the phase detector output signal; and, to complete the phase lock loop, a free-running blocking oscillator 32 which is adapted to be controlled in pulse repetition frequency (PRF) by signals from filter 30 and includes an output circuit from which square wave signals are generated and applied as another input to phase detector 28. The bit synchronizer further includes a differentiating circuit 34 which generates sampling pulses in response to one of the square wave signal outputs from the blocking oscillator.

Decision circuit 12, represented by a dashed-line block, comprises a flip-flop 36 having input AND gates 38 and 40. The incoming digital stream is applied directly to an input of AND gate 40 and through an inverter 41 to an input of AND gate 38. The sampling pulses generated by differentiater 34 are applied in parallel to the other inputs of AND gates 38 and 40. Flip-flop 36 is then rendered operative in response to trigger pulses allowed by AND gates 38 and 40, to generate a pair of mutually inverted rectangular waveforms, which, as will be clarified further on, are reshaped and retimed versions of the incoming digital stream.

The voltage controlled blocking oscillator 32 is shown in FIG. 2, and comprises a transistor 42 having its collector electrode connected through one winding 44 of a pulse transformer to a suitable source of negative voltage indicated at terminal 46. A voltage limiting diode 47 is connected across winding 44. The base of transistor 42 is connected to one terminal of a timing capacitor 48, and the emitter is connected to ground. The other terminal of timing capacitor 48 is connected through a second transformer winding 50 to ground. The pulse transformer also includes a third winding 52 across which a load resistor 53 is connected. One terminal of winding 52 is connected to ground and the second terminal is connected to the oscillator output circuit, which comprises a divide-by-two circuit 54.

As is explained in detail below, the PRF of the blocking oscillator is controlled by the discharge rate of timing capacitor 48, which in turn is controlled by a variable current source, responsive to the output signal from filter 30. This variable current source comprises a second transistor 56 having its emitter connected through a resistor 58 to the interconnection of capacitor 48 and the transistor 42 base electrode, its collector connected to negative voltage source 46 and its base connected through bias resistor 59 to voltage source 46. The current flow through transistor 56 is controlled by a DC signal coupled from the filter output to its base electrode by an emitter follower comprising transistor 60. The base electrode of transistor 60 is connected to the output of the loop filter; the collector is connected to the negative supply voltage at terminal 46; and, the emitter is connected directly to the base of transistor 56 and through a resistor 62 to ground.

Each time transistor 42 of the free-running blocking oscillator conducts, a pulse is transformer coupled to timing capacitor 48 and to the output divider circuit 54. The duration of this pulse (and the conducting period of transistor 42) is determined by the inductance and core saturation point of the transformer. However, the period between pulses is determined by the discharge rate of capacitor 48. The reason for this is that the pulse generated when transistor 42 conducts causes timing capacitor 48 to charge to some positive voltage level, as determined by the supply voltage at terminal 46 and the inherent phase reversal of the transformer coupling, due to the respective directions of windings 44 and 50. Since the emitter of transistor 42 is at ground potential, this positive charge in the base circuit of transistor 42 will reverse bias the base-emitter junction and hold transistor 42 in the "off" condition. Transistor 42 will not conduct again until timing capacitor 48 has been discharged to a level sufficient to forward bias the base-emitter junction of transistor 42 and thereby "turn on" the transistor.

The discharge rate of capacitor 48 is established by an IC time constant determined by the capacitance value of capacitor 48 and the current flow through resistor 58 and the emitter-collector of transistor 56. Clearly, therefore, this IC time constant can be conveniently varied over a wide range by changing the voltage level applied to the base of transistor 56 so as to vary the current flow through that transistor. Hence, base control of the current flow through transistor 56 controls the timing capacitor discharge rate, which in turn controls the period between pulses and, thus, the PRF.

In the absence of a control signal from filter 30, the blocking oscillator design is such that it operates in a free-running mode with a nominal PRF of twice the bit rate of the incoming digital stream. More specifically, if the established bit rate for the digital communication system in which this receiver is employed is $f$ nominal, then voltage source 46, transistor 56, and resistors 59 and 62 are selected to provide a current source for timing capacitor 48 which, with no signal from the filter, establishes a discharge rate resulting in an oscillator PRF of $2f$ nominal.

The divide-by-two circuit 54 connected at the output of the oscillator is designed to provide two square wave output signals, designated Ø1 and Ø2, which are mutually inverted and have a frequency of one-half the PRF of the pulse train from the blocking oscillator transformer. For example, divider 54 may comprise a bistable multivibrator which is toggled by the oscillator output pulse train, the Ø1 and Ø2 outputs being the "0" and "1" outputs of the bistable. Consequently, application of the $2f$ pulse train output from the oscillator to drive divider 54 results in a pair of square wave outputs, Ø1 and Ø2, which are phase displaced by 180° and have the same nominal frequency as the system bit rate.

The square wave used in generating the sampling pulses is referred to as the local timing signal; hence, in FIG. 2, output Ø1 is the timing signal since it is applied to differentiator 34 to provide a time base for the sampling pulses. It will also be observed that both Ø1 and Ø2 provide a useful time frame reference for indicating the phase of the Ø1 timing signal, each positive-going pulse of Ø2 indicating the first half cycle of the timing signal and each positive-going pulse of Ø1 indicating the second half cycle of the timing signal. Consequently, Ø1 and Ø2 are applied as inputs to phase detector 28 for phase comparison with the derived transition pulses from full wave rectifier 26 to thereby detect the phase error between the local timing signal and the incoming digital stream.

To provide the above mentioned error detection function, phase detector circuit 28 includes a digital phase detector comprising a pair of AND gates 64 and 66. The Ø1 output of divider 54 is applied to an input of AND gate 66, and the Ø2 square wave is applied to an input of AND gate 64. The transition pulses from rectifier 26 are applied to the other inputs of AND gates 64 and 66. Consequently, the AND gates function as a pair of early-late phase comparison sampling gates. If the PRF of the blocking oscillator is such that a transition pulse occurs during the first half cycle of the timing signal, i.e., when $\phi 2$ is relatively positive and Ø1 is relatively negative, then gate 64 will allow the pulse and gate 66 will inhibit the pulse; this phase comparison indicates that Ø1 timing signal is early with respect to the incoming digital stream, i.e., it leads the incoming bit rate, and the pulse generated from gate 64 is called a "retard" pulse. If the transition pulse occurs during the second half cycle of the timing signal, when Ø1 is relatively positive and Ø2 is relatively negative, gate 64 will inhibit the pulse and gate 66 will pass the pulse, indicating that the timing signal is late and lags the input bit rate, the pulse generated from gate 66 being called an "advance" pulse.

Phase detector 28 further includes a pair of monostable multivibrators 68 and 70, the outputs of which are respectively applied to a pair of resistors 72 and 74, the junction of which is connected to a network 76 of parallel sets of oppositely polarized diodes. The outputs of AND gates 64 and 66 are respectively connected to the trigger inputs of monostables 68 and 70, and the monostables and network 76 function as a push-pull drive and decoupling network to provide a common bipolar error signal to the loop filter and to isolate the filter from extended periods of disappearance of "advance" and "retard" pulses.

In the event the phase of the Ø1 timing signal is lagging that of the incoming bit rate, which is represented by the transition pulses, gate 66 is operative to produce an "advance" pulse to monostable 70. An output signal is taken only from the "1" side of monostable 70 so as to deliver to resistor 74 only positive-going pulses upon being triggered by an advance pulse. Should the timing signal lead the input bit rate, gate 64 applies a "retard" pulse to the other monostable from which an output is taken only from its "0" side. Consequently, monostable 68 produces only negative-going pulses upon being triggered by a "retard" pulse. The output pulses from both monostables are summed through resistors 72 and 74, respectively, to provide a bipolar (push-pull) pulsed output which indicates the direction of phase error. The output of this push-pull drive circuit is coupled to filter 30 through the decoupling network 76, which consists of two oppositely polarized parallel branches of series connected diodes $\mathbf{78}_1$ through 78*n* and $\mathbf{80}_1$ through 80*n*.

The loop filter 30 is an integrator circuit comprising a resistor 82 serially connected between diode network 76 and the base of emitter follower transistor 60 and a capacitor 84 and damping resistor 86 serially connected in that order between the base of transistor 60 and ground. The terminal of resistor 82 connected to network 76 is the filter input and the junction of resistor 82 and capacitor 84 is the filter output.

The total voltage drop of each series set of diodes of network 76 is chosen to be smaller than the amplitude of the push-pull drive pulses, thereby allowing a phase error input signal to reach the filter. The phase error signal, which consists of "advance" and "retard" pulses, is stored in capacitor 84 of the filter, whereby the voltage on this capacitor, at any instant, is representative of the integrated value of the input signal, and is applied as a control voltage, via emitter follower 60, to control the PRF of blocking oscillator 32.

Registor 82 is chosen so that there is a relatively small charge build upon capacitor 84. This allows the diodes of network 76 to be chosen such that the total forward voltage drop of each series set is larger than the maximum expected error voltage on capacitor 84. As a result, network 76 virtually open-circuits integrator integrator filter 30 from the source of error signals during complete signal fade (i.e., when there are no bipolar pulses from the push-pull drive), thereby preventing a loss of control voltage level and maintaining blocking oscillator 32 at the correct PRF. In other words, the decoupling circuit effectively increases the filter time constant so that the circuit can tolerate relatively long periods of fade. This feature is very useful under conditions of fading due to transmission or system characteristics, including reception of a long series of "marks" or "spaces," and provides an exceptional advantage in low bit rate telemetry.

Figure 3:
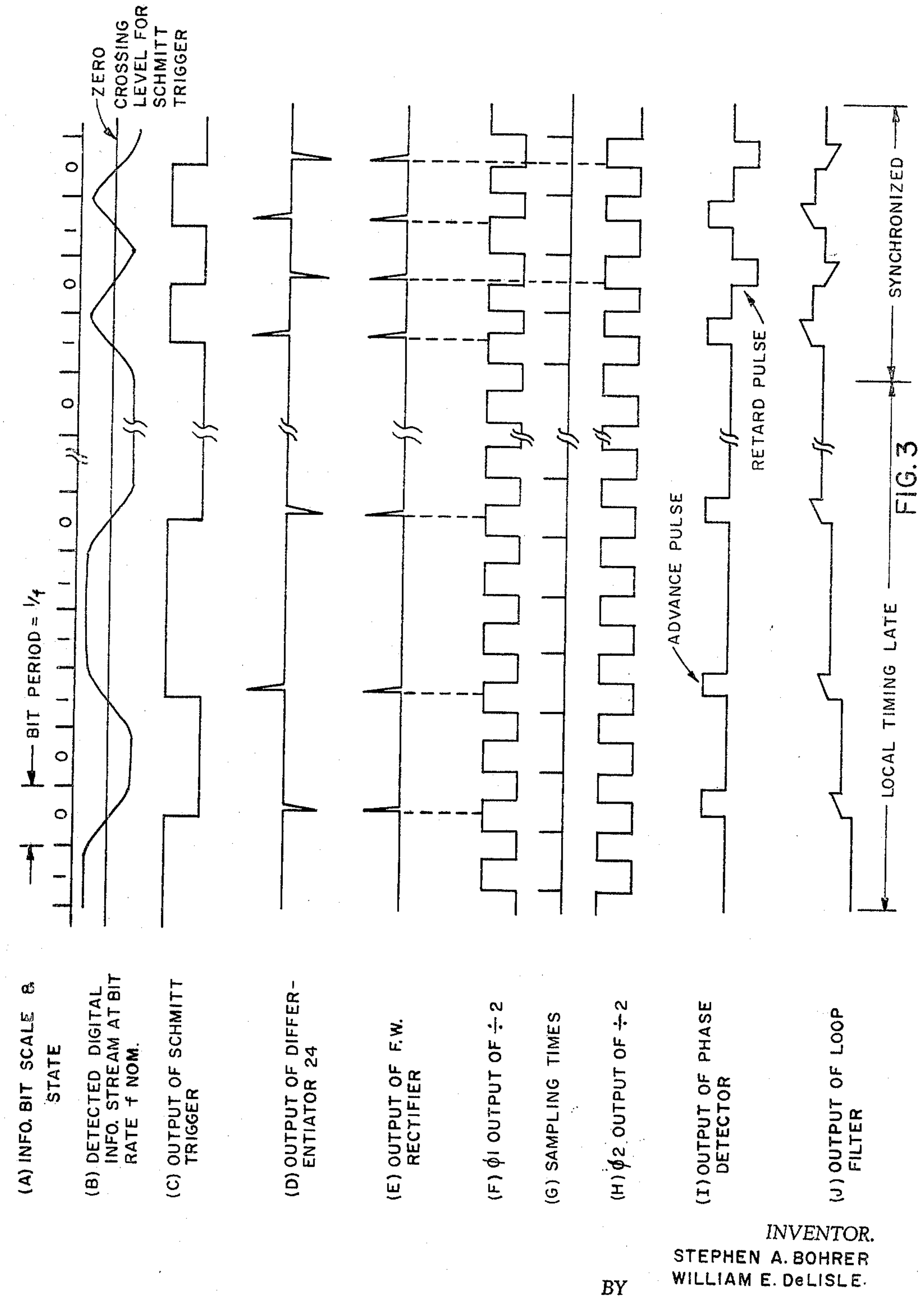
FIG. 3 presents waveforms used in explaining the operation of the invention.

Overall operation of the circuit shown in FIG. 2 will now be described with reference to the waveforms shown in FIG. 3. Line (A) of FIG. 3 is a time scale of the $1/f$ bit periods of the received data stream and indicates the binary state during each such bit period. It will be assumed that the detected digital information stream at the output of discriminator 16 has a bit rate of $f$ nominal and is distorted and band limited, as shown in waveform (B), such that the bit transitions (pulse zero crossings) occur one-half bit later than those of the ideal or undistorted data pattern of line (A). It will be noted, therefore, that the middle-of-the-bit sample, previously referred to, is with respect to the bit period of waveform (B), this sample being coincident with the end of each of the received data bits indicated in line (A). The distorted digital stream of waveform (B) is applied to input terminal 88. Upon application of the digital stream to Schmitt trigger 22, each zero crossing of waveform (B) triggers a change of state of the Schmitt trigger circuit in the same direction as that of the zero crossing to produce waveform (C). Differentiation of waveform (C) by circuit 24 then results in waveform (D), and passing this through full wave rectifier 26 produces waveform (E). It will be noted that waveform (E) comprises a series of positive-going pulses, each of which correspond to a transition of waveform (C).

The voltage controlled blocking oscillator 32 generates a pair of mutually inverted square wave outputs Ø1 and Ø2 from its output divide-by-two circuit. In the absence of a control signal from filter 30, these square waves are generated with the same nominal frequency as the incoming bit rate. In FIG. 3, waveform (F) represents square wave output Ø1 and waveform (H) represents Ø2. Output Ø1 serves as the local timing signal and is applied to differentiating circuit 34. The differentiated output of circuit 34 consists of positive-going and negative-going pulses respectively corresponding to the positive-going and negative-going transitions of waveform (F). In this instance, however, the threshold levels of the input devices to which the differentiated output of circuit 34 is applied are chosen so that only the positive-going pulses are employed as sampling pulses. Hence, only the positive-going transitions of the Ø1 timing signal determine the sampling times, as illustrated by line (G) in FIG. 3. Consequently, it is this positive-going transition of the timing signal which is to be synchronized as the middle-of-the-bit transition with respect to the bit period of waveform (B).

To provide the desired synchronization, the transition pulses (waveform E) and the Ø1 and Ø2 outputs of the blocking oscillator (waveforms F and H) are applied to phase detector 28 for comparison. For purposes of illustration, the first few bit periods of waveforms (F) and (H) are shown with the Ø1 local timing signal lagging the incoming bit rate, and the last few bits show the synchronized case. Hence, during the first few bits, the transition pulses of waveform (E) occur during the relatively positive half cycles of the Ø1 waveform (F), and each such coincident occurrence generates an "advance" pulse at the output of the phase detector, shown in waveform (I), indicating that the timing signal is late. This phase detector error signal, comprising a series of "advance" pulses, is applied to the loop filter 30 where it is integrated. The resulting output signal of the loop filter which is applied to control the PRF of the blocking oscillator is shown in waveform (J). It will be noted that each "advance" pulse results in the waveform (J) voltage level being integrated up to a higher level, the discontinuous step-up and step-down at the beginning and end, respectively, of each integration period being a desired damping effect due to resistor 86 (the scale of the steps on the drawing are exaggerated for clarity). In this instance, the increase in control voltage, waveform (J), advances the timing of the blocking oscillator to correct the phase error between the timing signal and the incoming bit rate of waveform (B).

For the synchronized case, an early-late phase error jitter occurs. For example, for an incoming binary sequence of 01010, as shown for the synchronized case in FIG. 3, consecutive transition pulses of waveform (E) will alternately coincide with a relatively positive half cycle of waveform (F) and a relatively positive half cycle of the Ø2 waveform (H). The resulting output of the phase detector, waveforms (I), is a bipolar drive comprising an alternating series of "advance" and "retard" pulses. The control signal from the loop filter, waveform (J), will then fluctuate slightly about some average DC voltage level. In the event the transition pulses disappear for an extended period, diode network 76 will decouple the filter to enable it to hold this DC voltage level throughout the fade period.

Referring now to the operation of decision circuit 12, the detected digital stream, waveform (B), is also applied via input terminal 88 to AND gate 40 and through inverter 41 to AND gate 38. When the timing signal is synchronized, it will be noted that each positive-going sampling pulse, represented by line (G), occurs at the middle of each bit period of waveform (B). Consequently, when these sampling pulses are applied to AND gates 38 and 40, flip-flop 36 will be reset at the middle of a bit period when the incoming digital stream is relatively positive and set at the middle of a bit period when the inverted digital is relatively positive. Hence, from the "1" and "0" outputs of flip-flop 36 is produced a pair of mutually inverted rectangular waveforms which carry the same binary information as the incoming digital stream and are shifted in time by one-half bit period from the input waveform (B).

From the foregoing, it is seen that applicants have provided a bit synchronizer which is comparatively simple in construction and may be implemented with inexpensive standard components in a compact package. The digital timing waveforms are available directly from the voltage controlled blocking oscillator, rather than requiring additional pulse shaping circuitry as with conventional VCO's. Digital phase detection is accomplished by a relatively uncomplicated circuit which includes a diode network memory for holding the PRF setting during extended periods of all "ones" or all "zeros." Further, the variable current source provides a reliable, inexpensive and rather simple method of controlling the PRF of the voltage controlled blocking oscillator over a relatively wide range with moderate control current requirements. Finally, the bit synchronizer in combination with decision circuit 12 provides an improved means for reshaping and retiming a stream of digital information so as to provide more accurate decoding of the binary information.

While a preferred embodiment of the invention has been described, it will be understood that it is not limited to the particular features and application illustrated. The invention might well be employed to reshape and retime digital streams in applications other than a radio receiving station. Other pulse shaping means may be used to derive the transition pulses. Tubes may be employed rather than transistors, and a number of other filter circuit configurations would be suitable for use in the phase lock loop. Also, clearly the Ø2 output could serve as the timing signal rather than Ø1, and the circuitry could obviously be designed to be timed by negative sampling pulses, provided they represented middle-of-the-bit transitions of the timing signal. It is intended, therefore, that the scope of the invention be limited only by the appended claims.

What is claimed is:

1. Apparatus for bit synchronizing a local timing signal with an incoming digital stream and for enabling accurate decoding of said digital stream comprising: means for deriving transition pulses from said incoming digital stream; a phase detector to which said derived transition pulses are applied as an input signal; a free-running blocking oscillator adapted to be controlled in pulse repetition frequency by a singal applied thereto and having an output circuit from which said local timing signal is available and from which signals indicative of the phase of said timing signal are applied as another input to said phase detector; a filter circuit connected between said phase detector and said blocking oscillator for providing a control signal to said oscillator in response to the output from said detector; said blocking oscillator comprising an amplifier having first, second and control electrodes, a source of reference potential, means connecting the first electrode of said amplifier to said source of reference potential, a timing capacitor having first and second terminals, a transformer coupling the second electrode of said amplifier to the first terminal of said timing capacitor and to said oscillator output circuit, the second terminal of said timing capacitor being connected to the control electrode of said amplifier, and a variable current source connected to the second terminal of said timing capacitor and responsive to the control signal from said filter for controlling the discharge time of said capacitor so as to thereby control the time between conducting periods of said amplifier, said blocking oscillator being operative in the absence of a control signal from said filter to generate a pulse train from said transformer which has a pulse repetition frequency of twice the bit rate of the incoming digital stream; said oscillator output circuit comprising a divide-by-two circuit having an input and first and second outputs, the pulse train from said transformer being applied to the input of said divide-by-two and said divide-by-two being operative in response to the pulse train applied at its input to generate first and second square wave reference signals from its first and second outputs, respectively, which are mutually inverted and have a frequency of one-half the pulse repetition frequency of the pulse train from said transformer; and means operative to provide a reshaped and retimed output digital stream in response to said first square wave reference signal; said phase detector comprising first and second AND gates each having first and second inputs and an output, said derived transition pulses being applied to the first inputs of said first and second AND gates, said first square wave reference signal being applied to the second input of said first AND gate, said second square wave reference signal being applied to the second input of said second AND gate, said first AND gate being operative to allow transition pulses at its output only when said reference signals are late with respect to the incoming digital stream, said second AND gate being operative to allow transition pulses at its output only when said reference signals are early with respect to the incoming digital stream, first and second monostable multivibrators each having a trigger input terminal and an output terminal, means respectively coupling the outputs of said first and second AND gates to the input terminals of said first and second multivibrators, means connected to the output terminals of said multivibrators for summing oppositely poled output pulses therefrom, and means connecting said summing means to said filter circuit.

2. Apparatus in accordance with claim 1 wherein said filter circuit has input and output terminals and includes a capacitor, and said means connecting said summing means to said filter circuit comprises first and second sets of series-connected diodes connected between said summing means and the input terminal of said filter, said sets of diodes being connected in parallel and oppositely poled relative to each other and having a forward voltage drop smaller than the amplitude of the pulses from said summing means and larger than the maximum storage voltage developed across said capacitor whereby said diodes are operative to decouple said filter from said summing means during periods of absence of pulses from said summing means, and further including means coupling the output terminal of said filter to the variable current source in said blocking oscillator.

3. Apparatus in accordance with claim 2 wherein said means for deriving transition pulses from said incoming digital stream comprises means for squaring the transitions of said incoming digital stream so as to provide a rectangular waveform signal, a first differentiator having an input and output, said rectangular waveform signal being applied to the input of said first differentiating circuit, and a full wave rectifier having an input coupled to the output of said first differentiator and an output from which said derived transition pulses are available.

4. Apparatus in accordance with claim 3 wherein said blocking oscillator amplifier comprises a first transistor, the first, second and control electrodes of said amplifier are the emitter, collector and base electrodes of said first transistor, respectively, said variable current source comprises a second transistor having emitter, collector and base electrodes, means including a resistor connected between the emitter of said second transistor and the second terminal of said blocking oscillator timing capacitor, a source of negative potential and means connecting the collector of said second transistor to said source of negative potential, and said means coupling the output terminal of said filter to said variable current source comprises an emitter follower connected between the output of said filter and the base of said second transistor.

5. Apparatus in accordance with claim 4 wherein said means for providing a reshaped and retimed output includes, a second differentiator having an input and an output, the first output of said divide-by-two being connected to the input of said second differentiator, a flip-flop having first and second inputs and corresponding outputs, third and fourth AND gates each having first and second inputs and an output, the output of said second differentiating circuit being connected to the first inputs of said third and fourth AND gates, said incoming digital stream being applied to the second input of said third AND gate, means for applying an inverted version of said incoming digital stream to the second input of said fourth AND gate, and means respectively coupling the outputs of said third and fourth AND gates to the first and second inputs of said flip-flop, reshaped and retimed mutually inverted versions of said incoming digital stream being available at the outputs of said flip-flop.

References Cited

UNITED STATES PATENTS

| | | | |
|---|---|---|---|
| 2,250,284 | 7/1941 | Wendt | 328—155 |
| 2,503,700 | 4/1950 | Barco | 328—155 |
| 2,521,058 | 9/1950 | Goldberg | 328—155 |
| 2,689,914 | 9/1954 | Keen | 328—63 |
| 2,923,820 | 2/1960 | Liguori et al. | 328—155 |
| 2,971,433 | 2/1961 | Akin | 331—112 |
| 3,114,109 | 12/1963 | Melas | 328—63 |
| 3,238,462 | 3/1966 | Ballard | 328—63 |
| 3,311,751 | 3/1967 | Maestre | 328—155 |

DONALD D. FORRER, Primary Examiner

H. DIXON, Assistant Examiner

U.S. Cl. X.R.

307—275; 328—164